(12) United States Patent
Weekly

(10) Patent No.: US 7,599,808 B2
(45) Date of Patent: Oct. 6, 2009

(54) APPLICATION OF MULTIPLE VOLTAGE DROOP DETECTION AND INSTRUCTION THROTTLING INSTANCES WITH CUSTOMIZED THRESHOLDS ACROSS A SEMICONDUCTOR CHIP

(75) Inventor: Roger D. Weekly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 11/848,380

(22) Filed: Aug. 31, 2007

(65) Prior Publication Data
US 2009/0063065 A1    Mar. 5, 2009

(51) Int. Cl.
*G01R 19/00* (2006.01)
(52) U.S. Cl. .................................... 702/64
(58) Field of Classification Search .............. 702/64; 324/765; 714/738
See application file for complete search history.

(56) References Cited

U.S. PATENT DOCUMENTS

| | | | |
|---|---|---|---|
| 5,894,423 A | 4/1999 | Ling et al. | |
| 6,191,647 B1 | 2/2001 | Tanaka et al. | |
| 6,219,723 B1 | 4/2001 | Hetherington et al. | |
| 6,472,856 B2 | 10/2002 | Groom et al. | |
| 6,636,976 B1 | 10/2003 | Grochowski et al. | |
| 6,675,301 B1 | 1/2004 | Kurosawa et al. | |
| 6,721,903 B2 | 4/2004 | Yoshioka et al. | |
| 6,799,070 B2 | 9/2004 | Wolfe et al. | |
| 6,819,538 B2 | 11/2004 | Blaauw et al. | |
| 6,922,111 B2 | 7/2005 | Kurd et al. | |
| 6,934,865 B2 | 8/2005 | Moritz et al. | |
| 7,035,785 B2 | 4/2006 | Grochowski et al. | |
| 7,071,723 B2* | 7/2006 | Krishnamoorthy et al. | .. 324/765 |
| 7,134,036 B1 | 11/2006 | Guan | |
| 7,233,163 B2* | 6/2007 | Krishnamoorthy et al. | .. 324/765 |
| 7,236,920 B2 | 6/2007 | Grochowski et al. | |
| 7,339,411 B2 | 3/2008 | Yuuki et al. | |
| 7,467,050 B2 | 12/2008 | Douriet et al. | |
| 7,480,810 B2 | 1/2009 | Gonzalez et al. | |
| 7,483,248 B1 | 1/2009 | Ho et al. | |
| 2004/0085085 A1 | 5/2004 | Muhtaroglu et al. | |
| 2005/0062507 A1 | 3/2005 | Naffziger et al. | |
| 2006/0132086 A1 | 6/2006 | Altenburg et al. | |
| 2007/0006012 A1 | 1/2007 | Mosur et al. | |
| 2007/0283172 A1 | 12/2007 | Douriet et al. | |
| 2008/0007272 A1 | 1/2008 | Ferraiolo et al. | |
| 2008/0082887 A1* | 4/2008 | Dhong et al. | ................ 714/738 |
| 2009/0063884 A1 | 3/2009 | Weekly | |

OTHER PUBLICATIONS

U.S. Appl. No. 11/420,820, filed May 30, 2006, Douriet.
U.S. Appl. No. 11/420,825, filed May 30, 2006, Douriet.

* cited by examiner

*Primary Examiner*—Tung S Lau
*Assistant Examiner*—Xiuquin Sun
(74) *Attorney, Agent, or Firm*—Yee & Associates, P.C.; Diana R. Gerhardt

(57) ABSTRACT

A method and system for applying multiple voltage droop detection and instruction throttling instances with customized thresholds across semiconductor chips. Environmental parameters are detected for various locations on a chip, and timing margins are determined for each location on the chip. An acceptable voltage droop for each location is determined based on the environmental parameters and the timing margins for the corresponding location. A droop threshold is then determined for each location based on the corresponding acceptable voltage droop determined for the corresponding location.

12 Claims, 12 Drawing Sheets

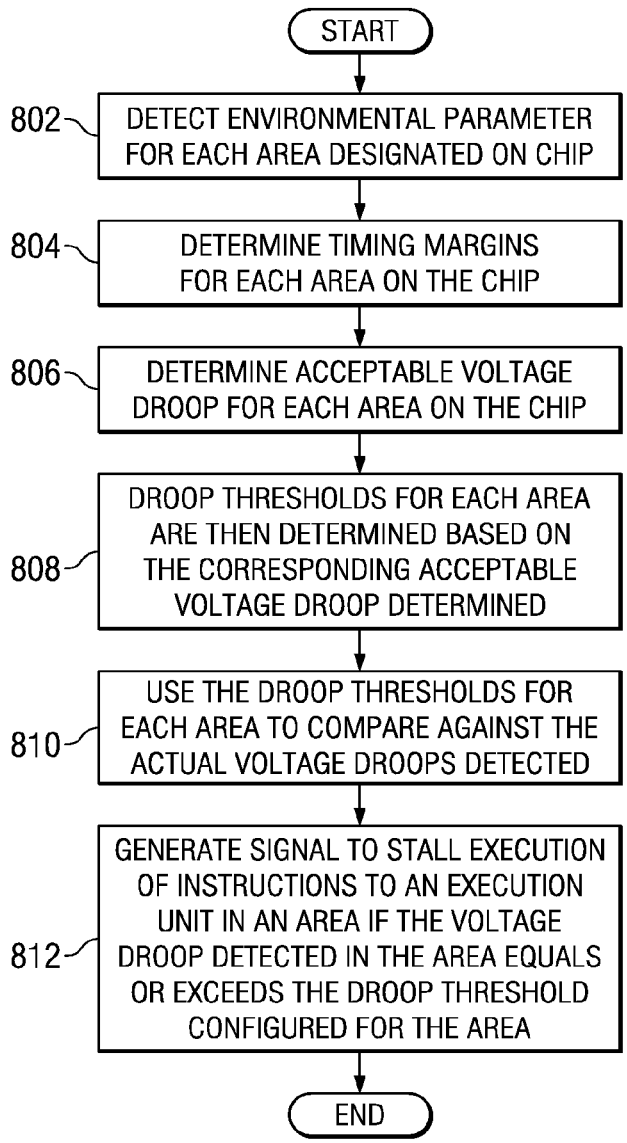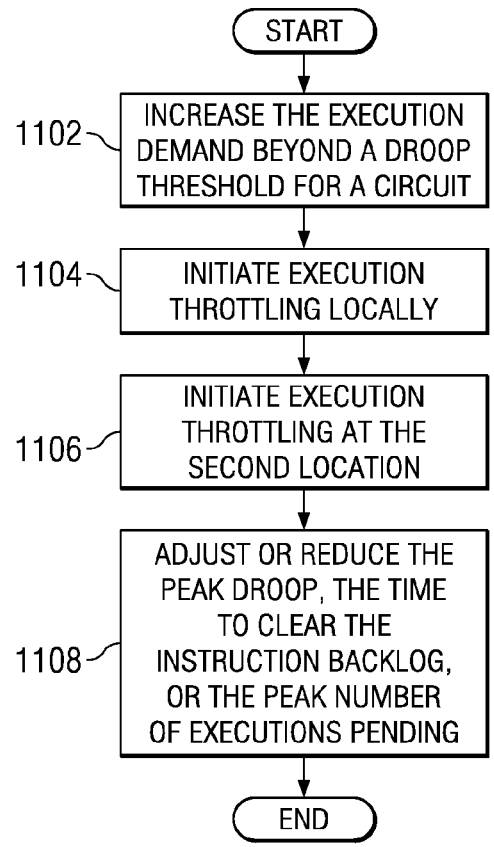

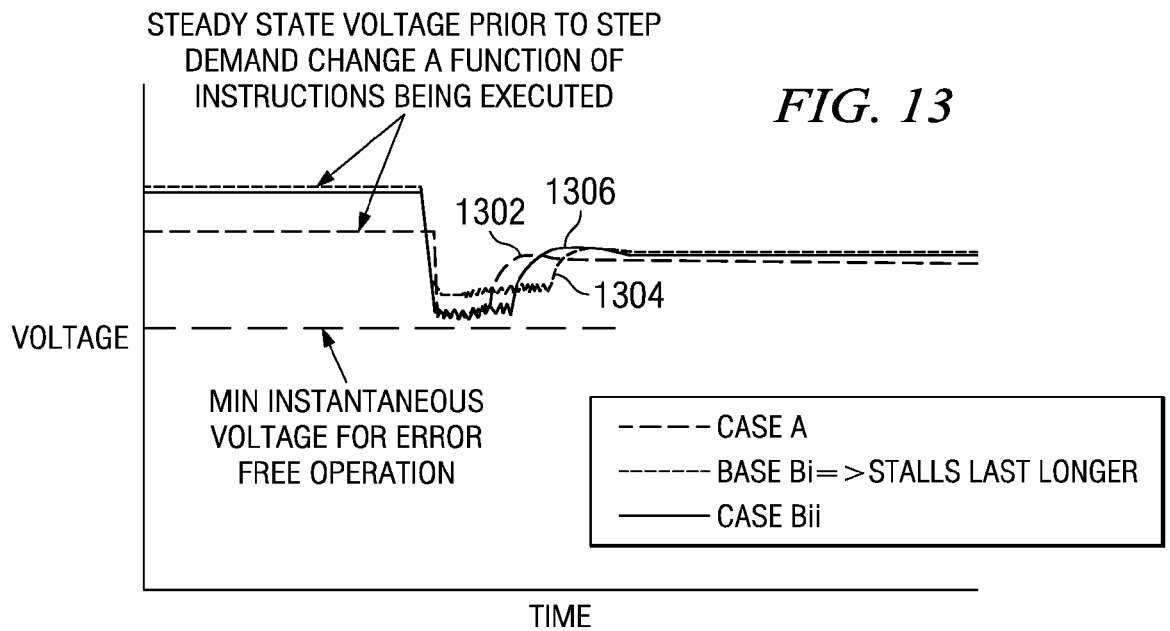
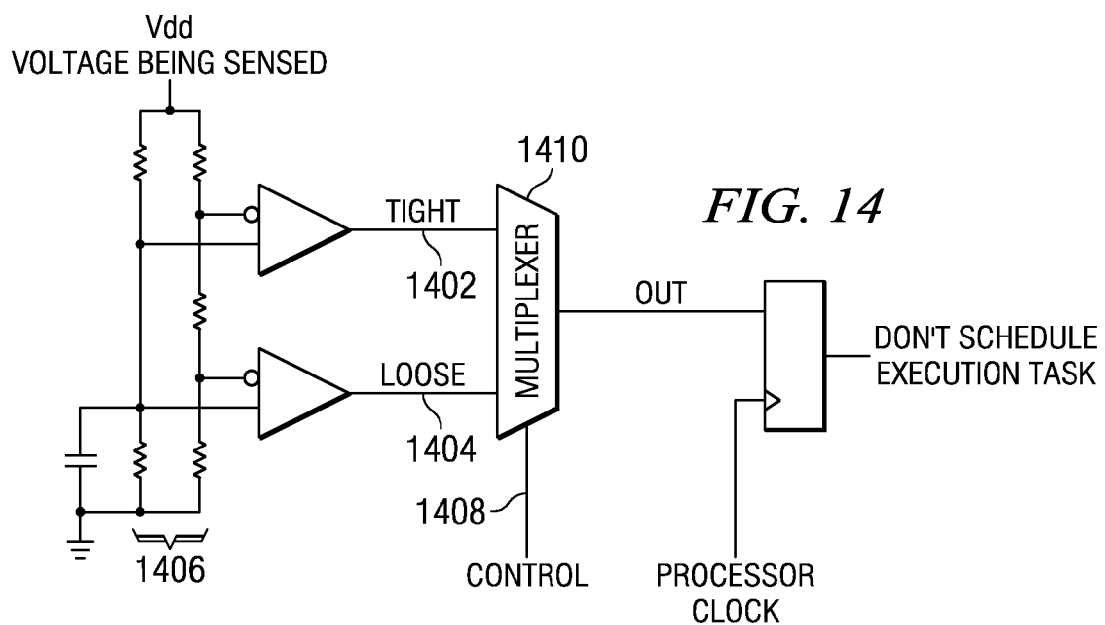

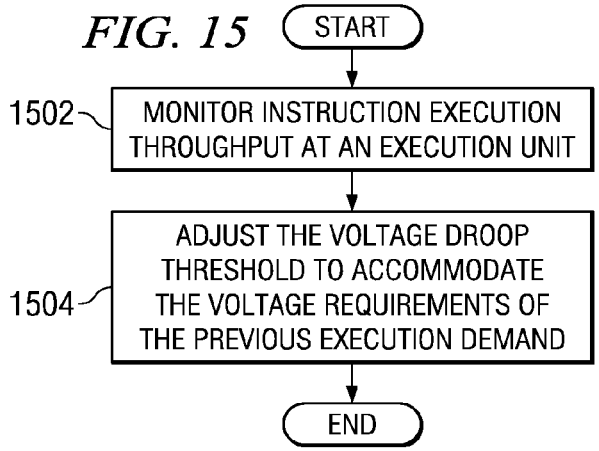
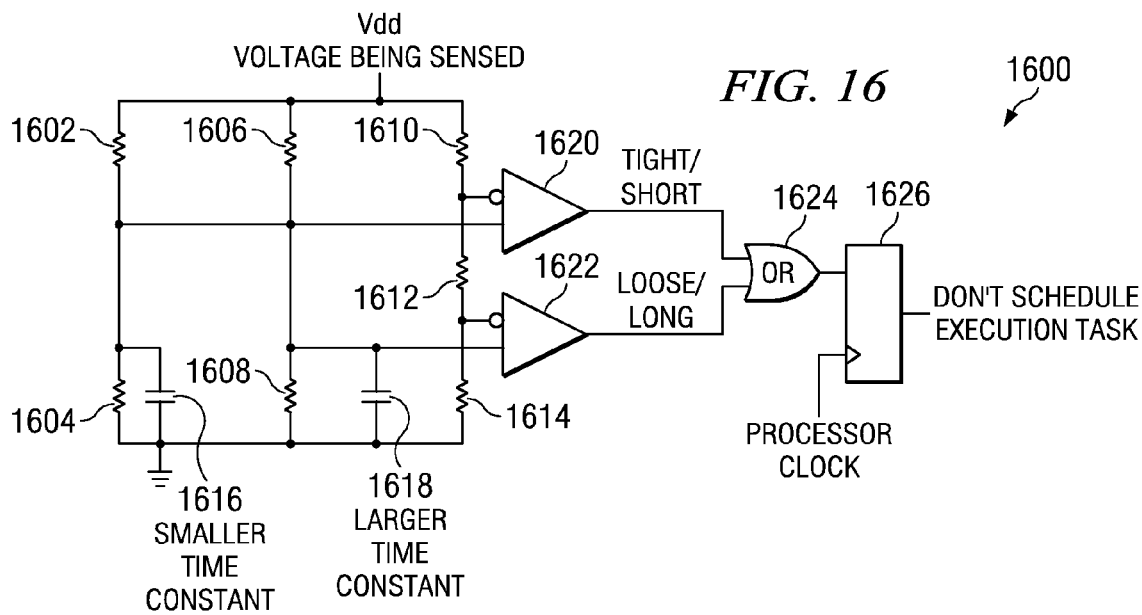
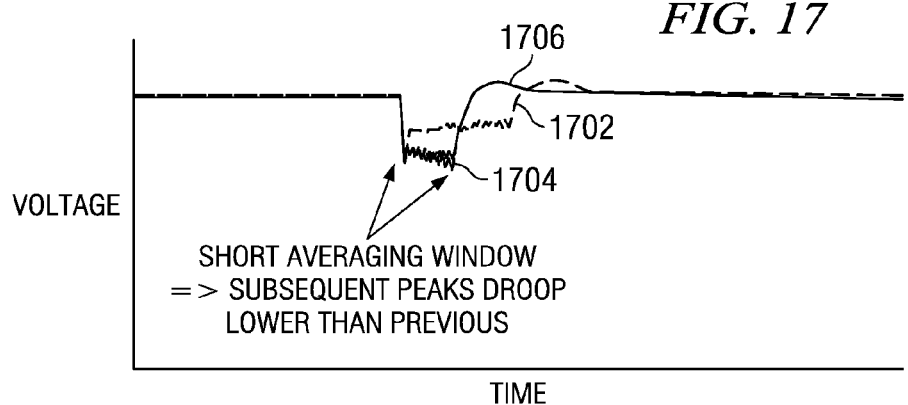

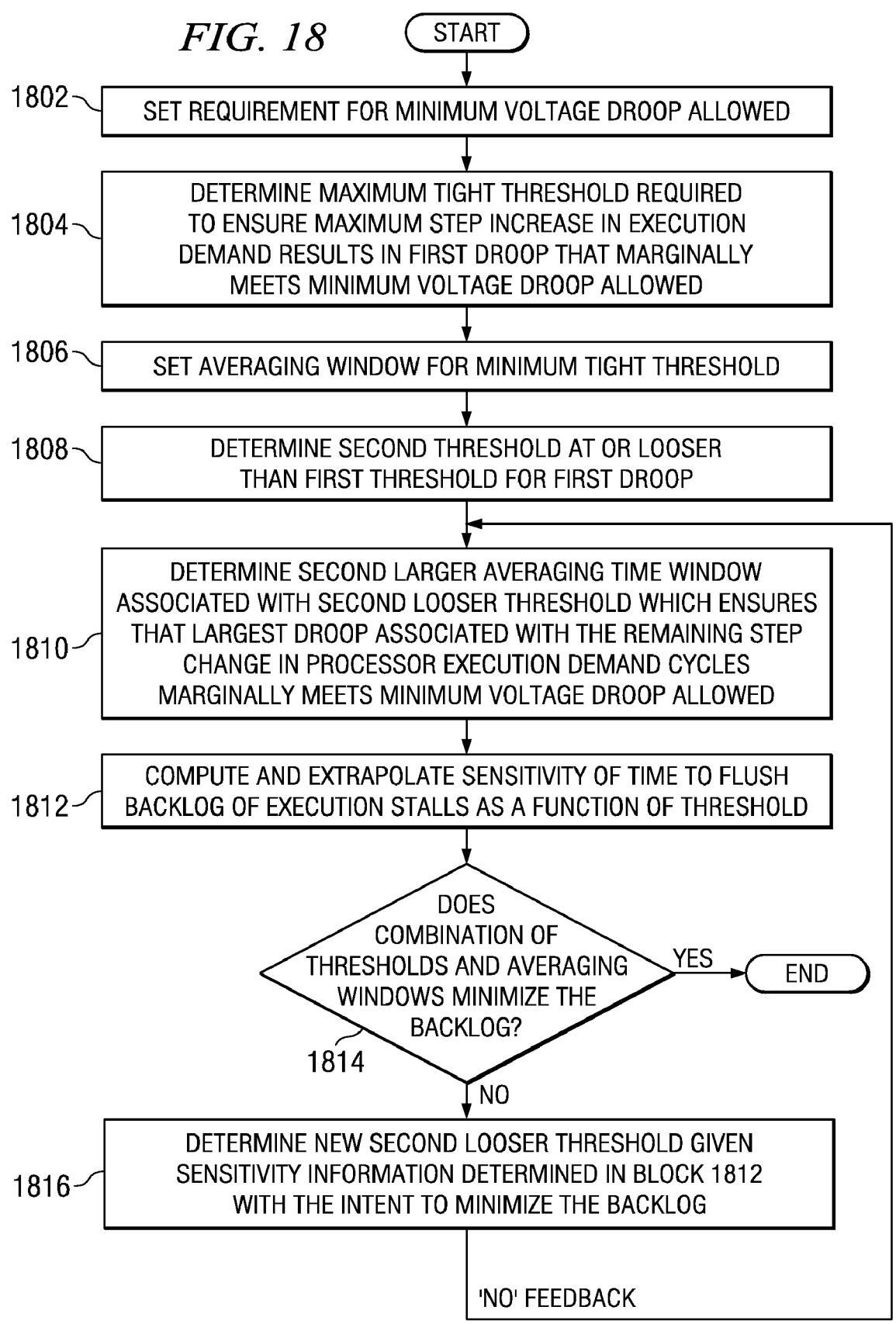

APPLICATION OF MULTIPLE VOLTAGE DROOP DETECTION AND INSTRUCTION THROTTLING INSTANCES WITH CUSTOMIZED THRESHOLDS ACROSS A SEMICONDUCTOR CHIP

CROSS REFERENCE TO RELATED APPLICATION

The present invention is related to co-pending U.S. patent application Ser. No. 11/847,557 entitled "Application of Multiple Voltage Droop Detection and Instruction Throttling Instances with Customized Thresholds across a Semiconductor Chip", filed even date hereof, assigned to the same assignee, and incorporated herein by reference.

BACKGROUND OF THE INVENTION

1. Field of the Invention

The present invention relates generally to integrated circuit device design, and in particular to integrated circuit design techniques to mitigate on-chip noise of such device. More particularly, the present invention is directed to applying multiple voltage droop detection and instruction throttling instances with customized thresholds across semiconductor chips.

2. Description of the Related Art

Improvements in manufacturing processes are enabling integrated circuit devices to offer more functionality as the size of individual transistors contained therein get smaller and smaller, thus allowing more transistors to be packaged within an integrated circuit device. As the trend of integrating more functions in a single high performance integrated circuit device (also called a chip) continues, the on-chip noise condition due to switching activity on the chip has become a major new challenge. Power supply and power distribution system noise, especially voltage dips (droops) due to large step current increases, are a limiting factor in how fast the circuits in the processors can operate. Traditionally, decoupling capacitors have been used to limit the magnitude of this noise. However, as design frequencies have risen over the years, decoupling capacitance is becoming either less effective at the frequencies that are required to have an effect, or are too costly in financial terms or power dissipation terms.

U.S. patent application Ser. No. 11/420,825, entitled "Method For Detecting Noise Events In Systems With Time Variable Operating Points", filed on May 30, 2006, and U.S. patent application Ser. No. 11/420,820, entitled "Mitigate Power Supply Noise Response By Throttling Execution Units Based Upon Voltage Sensing", also filed on May 30, 2006, describe mechanisms that detect or sense the need to throttle power consuming executions in microprocessors that, because of the resulting step current change presented to the power distribution network, would result in voltage droops which may put circuits as risk of falling outside their operational limits. A voltage droop is a loss or dip in output voltage from a device as the device tries to drive a load. These patent applications are particularly applicable to optimize the power, performance, yield, added capacitance, and other parameters of a microprocessor when the microprocessor (and other integrated circuits) experiences common sensitivities to voltage fluctuations, and those fluctuations are coincident across all circuits.

However, there are situations where the sensitivity to voltage droop of circuits in any given location on the chip may be greater or less than those in other areas of the chip. These sensitivities to voltage droop fluctuations across the chip may be due to the process variations in the manufacturing of any particular chip, the temperature gradient in the application of the chip, the voltage gradient in the application, and/or the nature of the circuits themselves.

SUMMARY OF THE INVENTION

The illustrative embodiments provide a method and system for applying multiple voltage droop detection and instruction throttling instances with customized thresholds across semiconductor chips. The illustrative embodiments detect environmental parameters for various locations on a chip and determine timing margins for each location on the chip. An acceptable voltage droop for a location is determined based on the environmental parameters and the timing margins for the location. The illustrative embodiments then detect a droop threshold for the location based on the corresponding acceptable voltage droop determined for the location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of a process for configuring voltage droop thresholds for execution units across a semiconductor chip independently in accordance with the illustrative embodiments;

FIG. 11 is a flowchart of a process for configuring voltage droop thresholds for execution units across a semiconductor chip independently to allow execution units electrically closer to a decoupling source to be influenced by other units farther down the path in accordance with the illustrative embodiments;

FIG. 13 is a chart illustrating an impact of selecting different voltage droop thresholds based on the state of instruction execution throughput in accordance with the illustrative embodiments;

FIG. 14 is an exemplary circuit diagram of a voltage droop sensor comprising multiple voltage droop thresholds in accordance with the illustrative embodiments;

FIG. 15 is a flowchart of a process for modifying the voltage droop threshold based on previous execution demand in accordance with the illustrative embodiments;

FIG. 16 is an exemplary circuit diagram of a voltage droop sensor comprising multiple voltage droop thresholds and multiple averaging windows in accordance with the illustrative embodiments;

FIG. 17 is a chart illustrating an impact of multiple voltage droop thresholds and multiple averaging windows in a circuit in accordance with the illustrative embodiments; and FIG. 18 is a flowchart of a process for configuring multiple voltage droop sensing circuits with distinctive voltage droop thresholds and averaging time windows for throttling execution units in accordance with the illustrative embodiments.

DETAILED DESCRIPTION OF THE PREFERRED EMBODIMENT

The illustrative embodiments improve upon the mechanisms referenced in U.S. patent application Ser. No. 11/420,825 and U.S. patent application Ser. No. 11/420,820, which are herein incorporated in their entirety. The mechanisms in U.S. patent application Ser. Nos. 11/420,825 and 11/420,820 detect and throttle power-consuming instructions to mitigate on-chip noise and improve chip performance. The illustrative embodiments further optimize frequency, yield, capacitance, and power in a semiconductor chip by customizing or personalizing the location or attribute parameters associated with detecting and throttling power-consuming instructions throughout areas on the chip.

Figure 1:
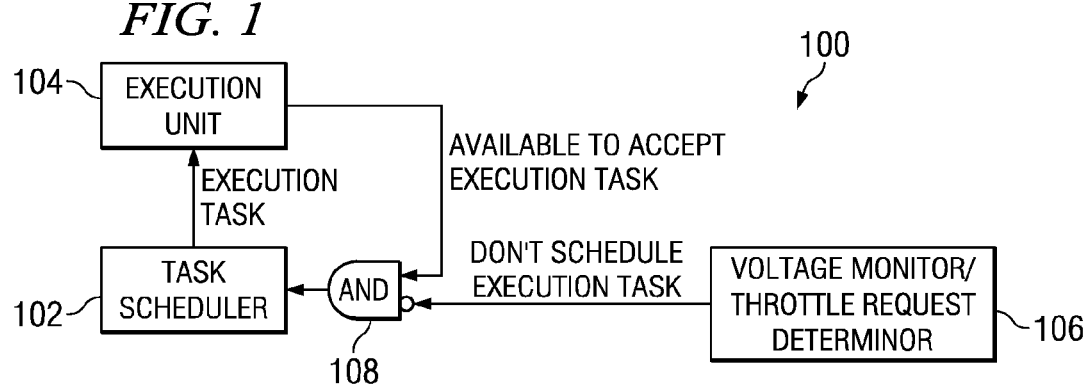
FIG. 1 is a block diagram illustrating known components of a system for mitigating power supply noise response by throttling execution units based upon voltage sensing.
Figure 2:
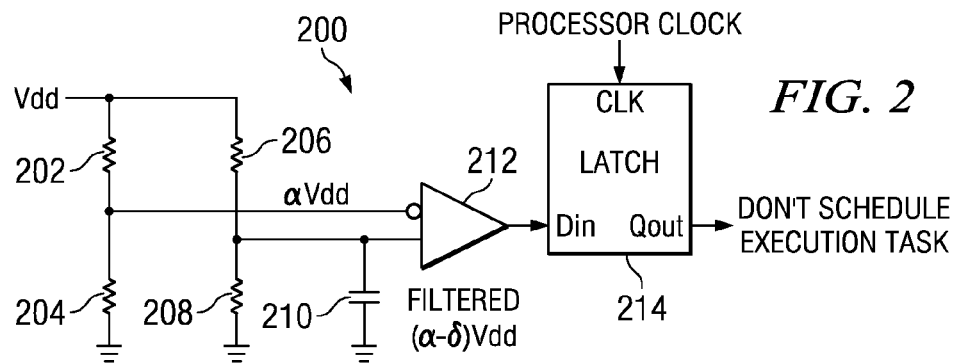
FIG. 2 is a circuit diagram for a known voltage droop sensing mechanism.

FIGS. 1-4 are provided first to illustrate the mechanisms for detecting and throttling instruction executions in a microprocessor as described in U.S. patent application Ser. Nos. 11/420,825 and 11/420,820. A mechanism for throttling executions in a chip is illustrated in FIG. 1, and a mechanism for detecting or sensing when throttling is required is illustrated in FIG. 2. FIGS. 3A and 3B compare the effect that no-throttling and throttling instruction execution has on the voltage droop at circuits in the chip, and illustrate the performance impact as given by the backlog of instructions waiting to be executed when given a demand probability of 90% in instruction initiations/cycle. The improvements provided by the illustrative embodiments are described in FIGS. 4-14.

Turning now to FIG. 1, a block diagram illustrating known components of a system for mitigating power supply noise response by throttling execution units based upon voltage sensing is shown. System 100 is comprised of task scheduler 102 or instruction dispatch unit, execution unit 104, voltage monitor/throttle request determiner unit 106, and AND 108. Execution unit 104 sends a signal to task scheduler 102 through AND 108 to indicate that execution unit 104 is available to accept an execution task (instruction). In response, task scheduler 102 sends an execution task to execution unit 104. After execution unit 104 begins the execution task, execution unit 104 sends a message to AND 108 that execution unit 104 is available to accept another execution task.

Voltage monitor/throttle request determiner unit 106 senses the circuit voltage and algorithmically determines if further executions by execution unit 104 will cause the voltage of system 100 to dip to unacceptably low levels. If voltage monitor/throttle request determiner unit 106 determines that further executions will cause the voltage to dip to unacceptably low levels (i.e., below a voltage droop threshold), voltage monitor/throttle request determiner unit 106 sends a signal to AND 108 which indicates that an execution task should not be scheduled during any given instruction cycle. This signal is AND'd to the signal sourced from execution unit 104. Based on the signal from voltage monitor/throttle request determiner unit 106, AND 108 subsequently indicates to task scheduler 102 that task scheduler 102 should not initiate a task to execution unit 104. For example, if instruction execution causes the voltage to dip to unacceptably low levels, voltage monitor/throttle request determiner unit 106 signals to task scheduler 102 via AND 108 that execution unit 104 is not in a state to accept subsequent instructions, thereby stalling, or throttling back, instruction execution. If voltage monitor/throttle request determiner unit 106 determines no further instructions can be accepted by execution unit 104 due to voltage droop, voltage monitor/throttle request determiner unit 106 continues to monitor the voltage and possibly the voltage's derivative and changes its signal to AND 108 to indicate instruction dispatches to the execution unit may commence under other conditions algorithmically determined.

When AND 108 receives a signal from sensing unit 106 through an inverter, AND 108 will register the signal received from voltage monitor/throttle request determiner unit 106 as false, while the message from execution unit 104 will register as true. In this situation, AND 108 sends a "do not schedule" execution task message to task scheduler 102. If voltage monitor/throttle request determiner unit 106 determines that further executions will not cause the voltage to dip to unacceptably low levels, voltage monitor/throttle request determiner unit 106 does not send a signal to AND 108. This causes the inverter to show as true, thereby allowing AND 108 to send a message to task scheduler 102 that execution unit 104 is available to accept another execution task.

The mechanism in FIG. 1 may modify the excitation of the processor complex, including the elements discussed earlier, as well as other circuits which share the same part of a chip, a chip, a module, a printed circuit card, and/or a system, depending upon the duration and frequency of the excitation. A processor complex is the processor along with its memory infrastructure, such as a cache, and may include other structures, including other chips, powered from the same power supply. The modification is such that voltage dips, also known as noise, caused by the interaction of the currents induced by the chip circuits with the power delivery network, including regulators, transmission paths, and decoupling, may be significantly reduced. Reduced voltage dips, or noise, in a system allows the system designer the flexibility to reduce power by lowering the DC voltage to the circuits, since most of today's logic circuits clock speeds are determined by the circuit's capability to meet cycle times at the lowest instantaneous voltage the circuit ever sees.

FIG. 2 is a circuit diagram of a known voltage droop sensing mechanism, such as voltage monitor/throttle request determiner 106 in FIG. 1. Voltage droop sensing circuit 200 comprises resistors 202, 204, 206, and 208, capacitor 210, comparator 212, and latch 214. A comparator is a device which compares two voltages or currents, and switches its output to indicate which is larger. Resistors 202 and 204 comprise a resistor divider network that presents a first fraction of the Vdd voltage to the inverting input of comparator 212. This first fraction is represented by the term $\alpha$. $\alpha$ is representative of a value between 0 and 1. $\alpha$ is chosen to assure that the voltage presented to the inverting input of comparator 212 is within the operational range of comparator 212. Vdd represents the voltage supplied to the circuit.

Resistors 206 and 208 comprise a second resistor divider network that presents a second fraction for the Vdd voltage to the non-inverting input of comparator 212. This voltage is filtered by capacitor 210 so that the voltage at the non-inverting input of comparator 212 is averaged over the time period determined by the values of resistors 206 and 208 and capacitor 210. The second fraction is slightly less than the first fraction. The second fraction is represented by the term $(\alpha-\delta)$. $\delta$ is representative of a value between 0 and that value represented by first fraction $\alpha$. $\delta$ divided by $\alpha$ represents the fraction of the average voltage on Vdd, that should the noise droop below that average voltage on Vdd, then initiation of instruction executions will be stalled.

Latch 214 is comprised of Din, where the comparator inputs to the latch, Qout, which sends the output signal to prevent scheduling of an execution task, and a processor clock input. The unfiltered Vdd containing noise, $\alpha$vdd, is compared to the filtered Vdd, $(\alpha-\delta)$Vdd, by comparator 212. If $\alpha$Vdd is lower than $(\alpha-\delta)$Vdd, then comparator 212 sends a signal to latch 214, and latch 214 sends the message to disallow the scheduling of a subsequent execution task.

Those skilled in the art may recognize that these functions described above may be accomplished via other means such as sampling and holds, comparator chains, etc. The description above has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Figure 3A:
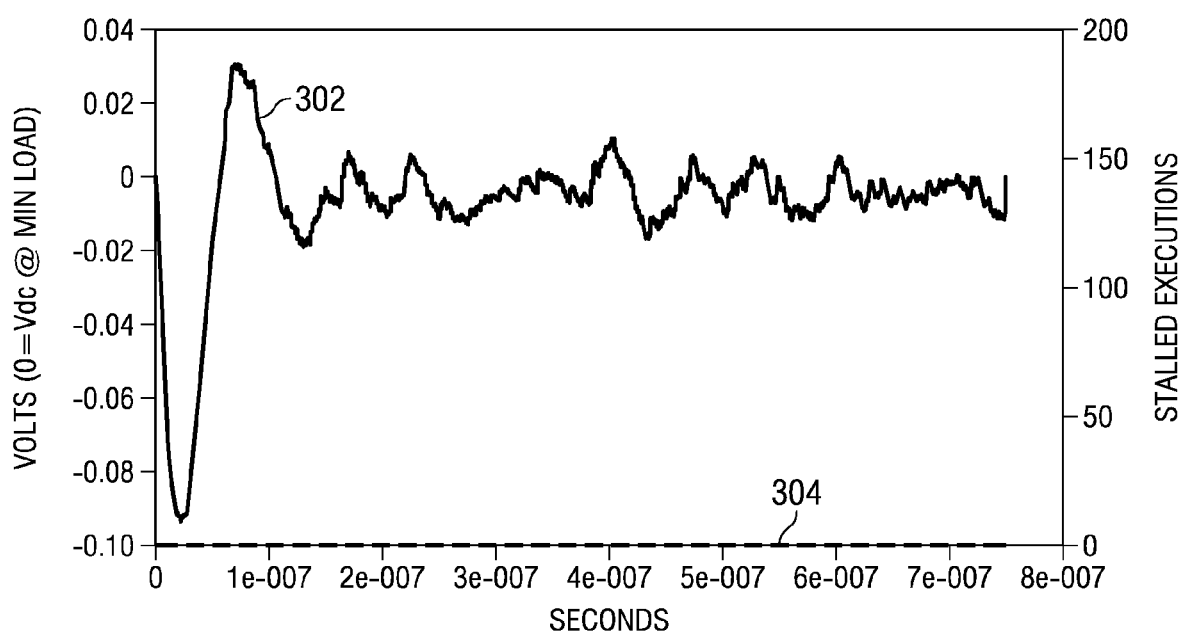
FIG. 3A is a chart depicting the plot of a typical voltage response to a change in demand in processor activity from nearly no executions to initializing executions on 90% of subsequent cycles.

FIG. 3A is a chart depicting the plot, designated as 302, of a typical voltage response to a change in demand in processor activity from nearly no executions to initializing executions on 90% of subsequent cycles. The left axis represents the voltage, from −0.1 to 0.04, where 0=Vdc at the minimum load. The right axis represents the number of stalled executions, from 0 to 200. The horizontal axis represents the number of nanoseconds that have passed, ranging from 0 to 800 ns. In this example, executions requested by the task scheduler are not stalled, as shown by plot 304. The voltage in this example is 90 mv below the no-load average voltage. By sensing the voltage droop and depending upon some function of the voltage stalling the execution of subsequent instructions until the voltage recovers, the voltage droop actually experienced may be reduced significantly.

Figure 3B:
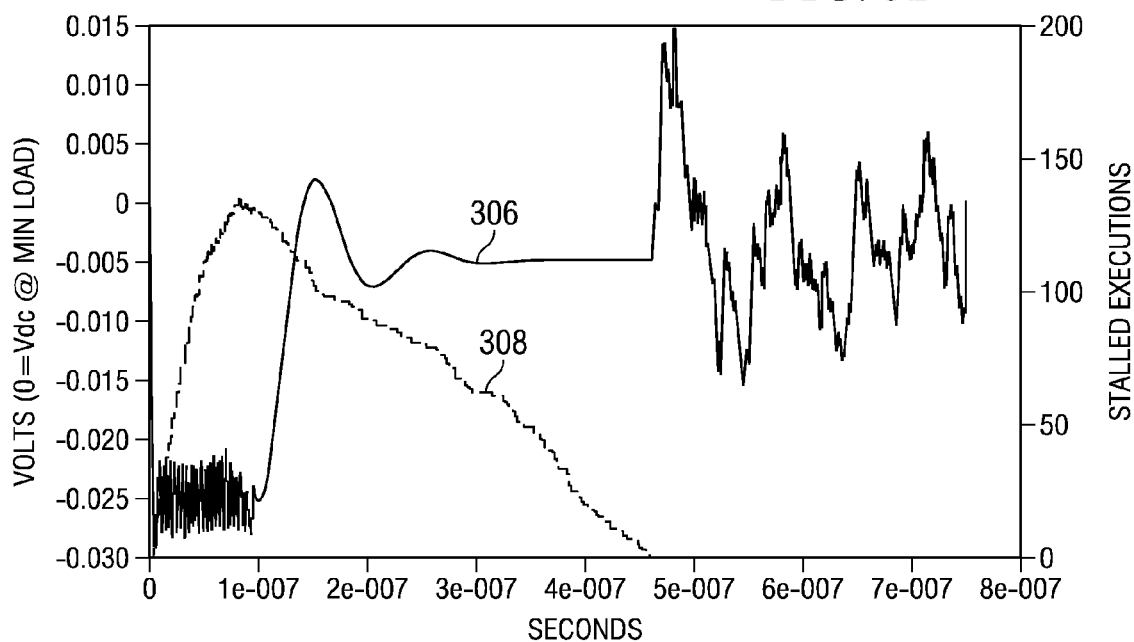
FIG. 3B is a chart depicting the plot of a typical voltage response to a change in demand in processor activity from nearly no executions to initializing executions on 90% of subsequent cycles using the system illustrated in FIG. 1.

FIG. 3B is a chart depicting the plot, designated as 306, of a typical voltage response to a change in demand in processor activity from nearly no executions to initializing executions on 90% of subsequent cycles using system 100 illustrated in FIG. 1. The left axis represents the voltage, from −0.03 to 0.015, where 0=Vdc at the minimum load. The right axis represents the number of stalled executions, from 0 to 200. The horizontal axis represents the number of nanoseconds that have passed, ranging from 0 to 800 ns. In this example, executions requested by the task scheduler are stalled. The number of stalls increases from zero to about 140 instructions, as shown by plot 308, while the voltage is clipped to roughly 30 mv, as shown by plot 306. However, all instructions will complete execution within 450 ns after the step current change, assuming 1800 cycles of a four gigahertz (4 GHz) processor frequency.

The illustrative embodiments employ the core ideas of using voltage droop sensing circuitry and the execution throttling circuitry as disclosed in FIGS. 1-3B to mitigate on-chip noise and improve upon those ideas by placing instantiations of the voltage droop sensing circuitry and the execution throttling circuitry around individual or local clusters of execution units in a chip. The illustrative embodiments then configure the voltage droop threshold on each execution unit or unit cluster independently to account for the voltage margin present for each circuit. The margin may be higher or lower for any particular local collection of circuits as a result of various environmental parameters, including the local temperature of those circuits, voltage gradient across the die, or process variations such as across chip line variations (ACLV), since these parameters may be different on different areas of the chip.

Figure 4:
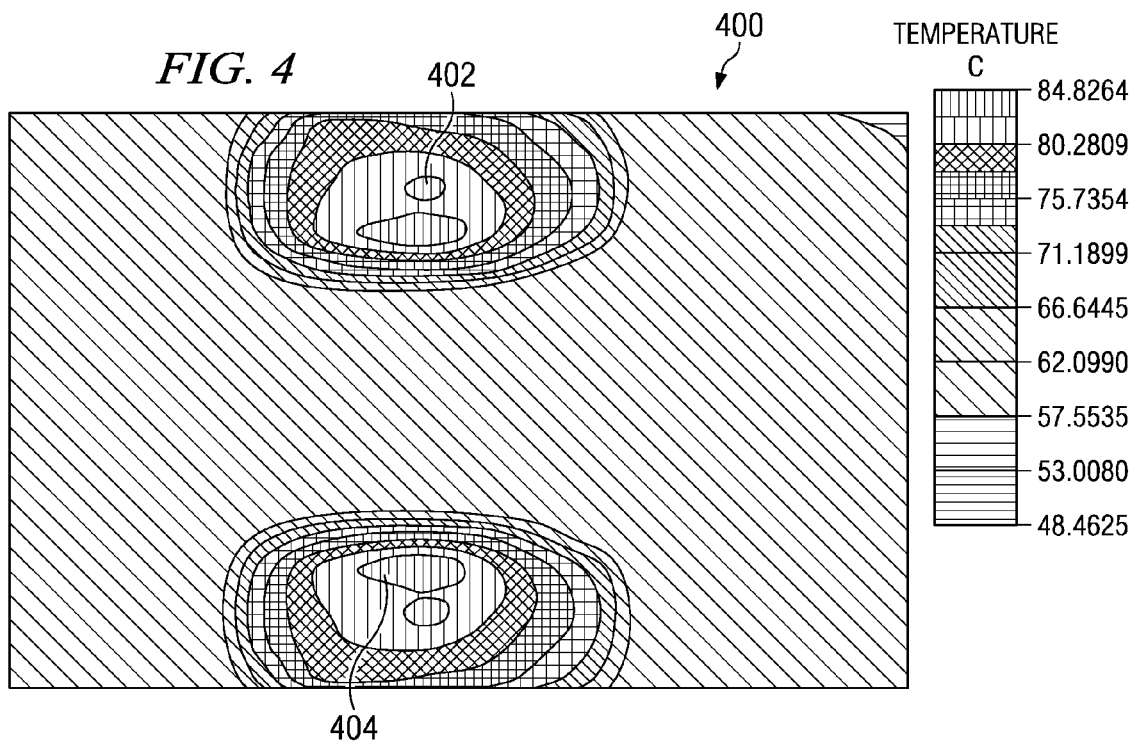
FIG. 4 is an exemplary spatial map illustrating temperature variations across a given chip in accordance with the illustrative embodiments.

FIG. 4 is an exemplary spatial map illustrating temperature variations across a given chip in accordance with the illustrative embodiments. A given chip design may contain various environmental parameters, such as temperature, voltage, and timing margins, which affect the performance of the chip. Temperature map 400 illustrates that variations in temperature may occur across the chip. These thermal variations on the chip may be due to the amount of processor activity on the circuits, external room temperature variations, process or design variations that may result in localized leakage power dissipation on the chip, thermal interface variations due to heat sink or cold plate construction, and chip or package warpage characteristics which result from technology and design choices, and the like. In this example, temperature map 400 comprises thermal hotspots 402 and 404 which are illustrated in the north and south regions of the chip. Thus, these areas of the chip comprise progressively higher temperatures than other areas of the chip, which can adversely affect performance. Temperature map 400 may be generated using any known method of detecting thermal conditions, such as by placing environmental sensors at various suitable locations on the chip.

Figure 5:
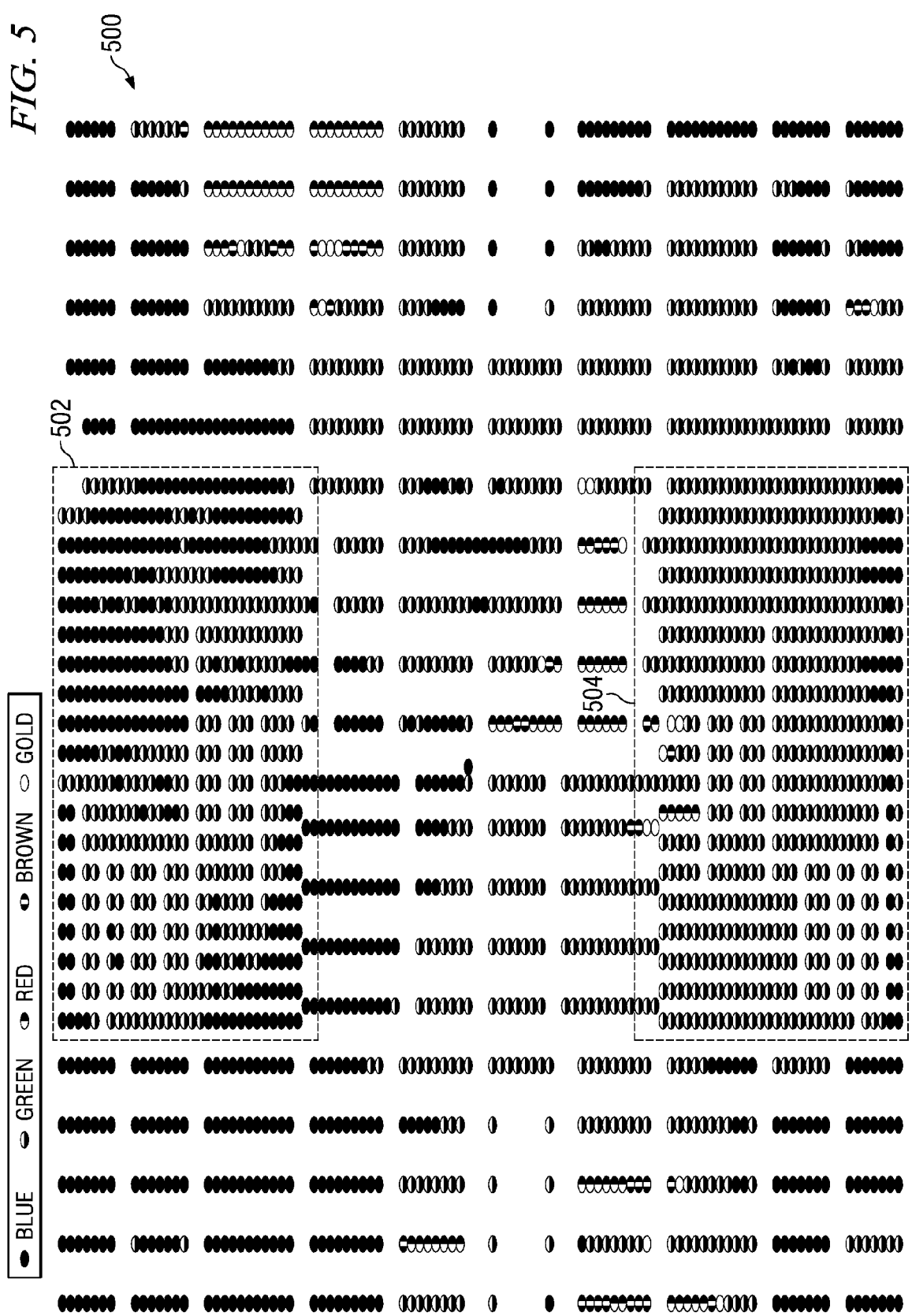
FIG. 5 is an exemplary spatial map illustrating voltage gradient variations across the given chip in accordance with the illustrative embodiments.

FIG. 5 is an exemplary spatial map illustrating voltage gradient variations across the given chip in accordance with the illustrative embodiments. Voltage gradient map 500 illustrates the C4 connections between the chip and the first level packaging, and the variations in voltage that can occur across the chip. These voltage variations may be due to power distribution design, including design at the chip, chip carrier, card, and system levels. The specific DC paths from regulator sources to chip circuits, in concert with current demands from these circuits and others may also influence these voltage variations. In this example, voltage gradient map 500 comprises high voltage areas 502 and 504 which are illustrated in the north and south regions of the chip. These high voltage areas 502 and 504 correspond to the thermal hotspots 402 and 404 in FIG. 4. Voltage gradient map 500 may be generated using any known method of detecting voltage conditions, such as using voltage meters placed at various suitable locations on the chip.

Figure 6:
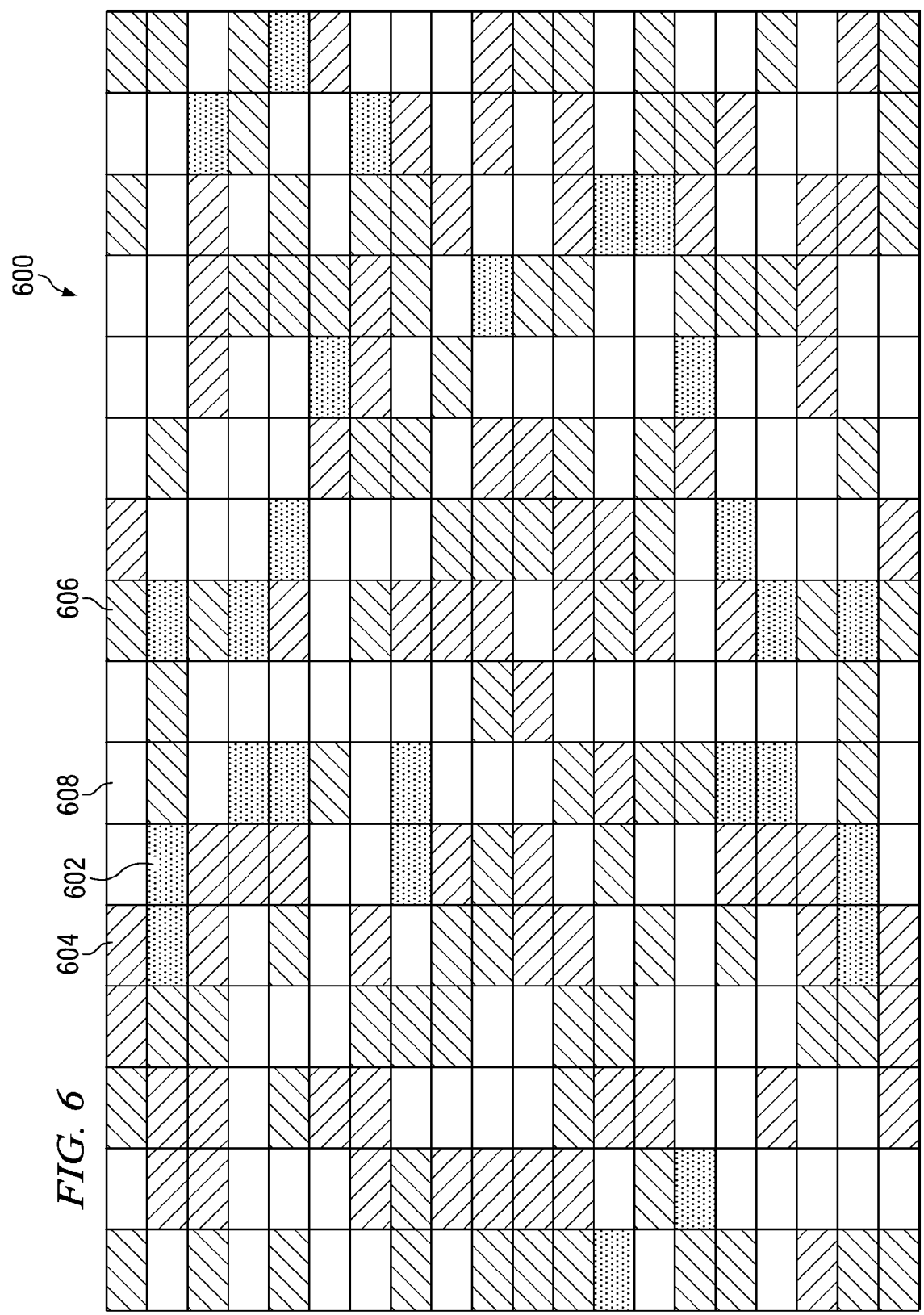
FIG. 6 is an exemplary timing margin map illustrating timing margin variations across the given chip in accordance with the illustrative embodiments.

FIG. 6 is an exemplary timing margin map illustrating timing margin variations across the given chip in accordance with the illustrative embodiments. Timing margin map 600 illustrates the timing slack for each area on the chip. Timing slack refers to the difference between the required time constraint in which logic is to arrive at a device, and the actual arrival time of the logic at the device. A positive timing slack (i.e., the logic arrives earlier than the required time) is desirable. In this illustrative example, section 602 comprises no timing margin or slack. Areas 608, 606, and 604 contain progressively more timing slack (positive slack) than section 602. Thus, in this example, the areas marked similar to area 602 are operating according to the timing requirements of the chip, while the other areas marked similar to areas 608, 606, and 604, respectively, are operating progressively faster than the timing requirements of the chip.

Figure 7:
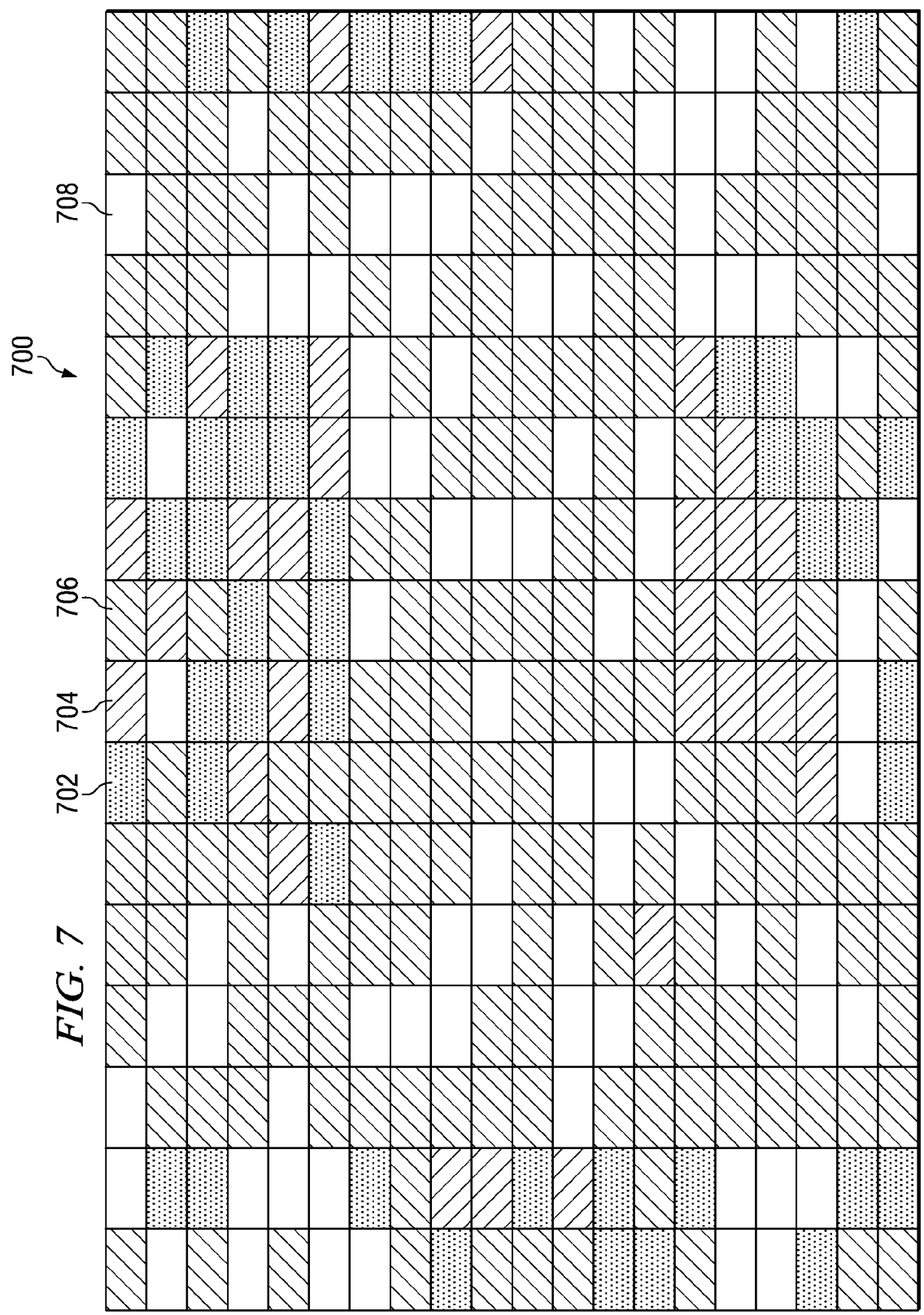
FIG. 7 is an exemplary voltage droop map illustrating acceptable voltage droop across the given chip in accordance with the illustrative embodiments.

FIG. 7 is an exemplary voltage droop map illustrating acceptable voltage droop across the given chip in accordance with the illustrative embodiments. Voltage droop map 700 may be generated based on circuit performance sensitivities to the environmental parameters illustrated in FIGS. 4 and 5 and the timing margin map 600 in FIG. 6. Specifically, the temperature parameters, voltage parameters, and circuit map of the timing margins for a chip may be used to create voltage droop map 700 which shows the acceptable voltage droop for each area of the chip for maintaining error-free operation of the chip. Thus, voltage droop map 700 may be used to configure the voltage droop thresholds for each of the areas on the chip to ensure circuits on the chip are operating within acceptable performance parameters. Various thresholds may be configured to be more stringent (tight) in some areas and more lenient (loose) in other areas of the chip, depending upon the content of voltage droop map 700.

Temperature and voltage parameters for a circuit are typically about 1% per 20 degrees Celsius (C.), and 1% per 1% voltage change. The voltage droop information in voltage droop map 700 may be used to configure the voltage droop threshold in each area of the chip independently to account for the voltage margins present for those circuits in those areas. These droop thresholds configured for each area of the chip allow for throttling instruction execution at a more granular or personalized level than previous methods. For instance, in this example, area 702 and similarly marked areas indicate that the droop threshold should be set to 25 mv below the average voltage, with area 704 and similarly marked areas set to 30 mv, area 706 and similarly marked areas set to 40 mv, and area 708 and similarly marked areas set to 50 mv below the average voltage in those areas. Thus, area 702 is allowed less droop for more stringent control of instruction execution in this area, while area 708 is allowed more droop for more lenient control of instruction execution in this area. In addition, if discernable, other environmental parameters which affect the required minimum voltage needed at any of the execution units' circuits for error-free operation, such as across chip line variations, may also be considered when generating voltage droop map 700.

The droop thresholds for each area need not be static, but the droop thresholds may be periodically updated to reflect the temporal nature of some of these environmental parameters. For instance, the local temperature may drift due to activity or computer room temperature variations, so the droop allowed for a particular area of the chip may be lower in a hotter environment than the droop allowed in a colder environment.

FIG. 8 is a flowchart of a process for configuring voltage droop thresholds for execution units across a semiconductor chip independently in accordance with the illustrative embodiments. The process begins with detecting the environmental parameters for each area designated on the chip (step 802). These environmental parameters may include, but are not limited to, temperature, voltage gradient, across chip line variations, etc. The process also determines the timing margins for each area on the chip (step 804). The timing margins, or slack, indicate how quickly logic actually arrives at its destination in comparison with the logic's required arrival time. Once the environmental parameters and timing margins are known, the process uses this information to determine the acceptable voltage droop for each area on the chip (step 806). The droop thresholds for each area are then determined based on the corresponding acceptable voltage droop determined (step 808). The process then uses the droop thresholds for each area to compare against the actual voltage droops detected (step 810). A signal is generated to stall execution of instructions to an execution unit in an area if the voltage droop detected in the area equals or exceeds the droop threshold configured for the area (step 812). Consequently, use of individual droop thresholds on areas of the chip enables further optimization of chip performance at a more granular level than previous methods.

The illustrative embodiments also allow for configuring the voltage droop threshold on each execution unit on a chip independently such that execution units which are electrically closer to a decoupling source (and thus experience voltage droop from currents from circuits in which they are in the decoupling distribution path as well as from currents from themselves) will have their local droop sensing circuitry influenced by the droop sensing circuitry of the execution units further down the decoupling distribution path. This influence further limits the droop of those execution units farthest away from the decoupling source by ensuring that the closer execution units limit further noise induced on the decoupling distribution path to those execution units at the end of the decoupling distribution path if those execution units in the locations farthest away are already throttling their instruction execution.

Figure 9A:
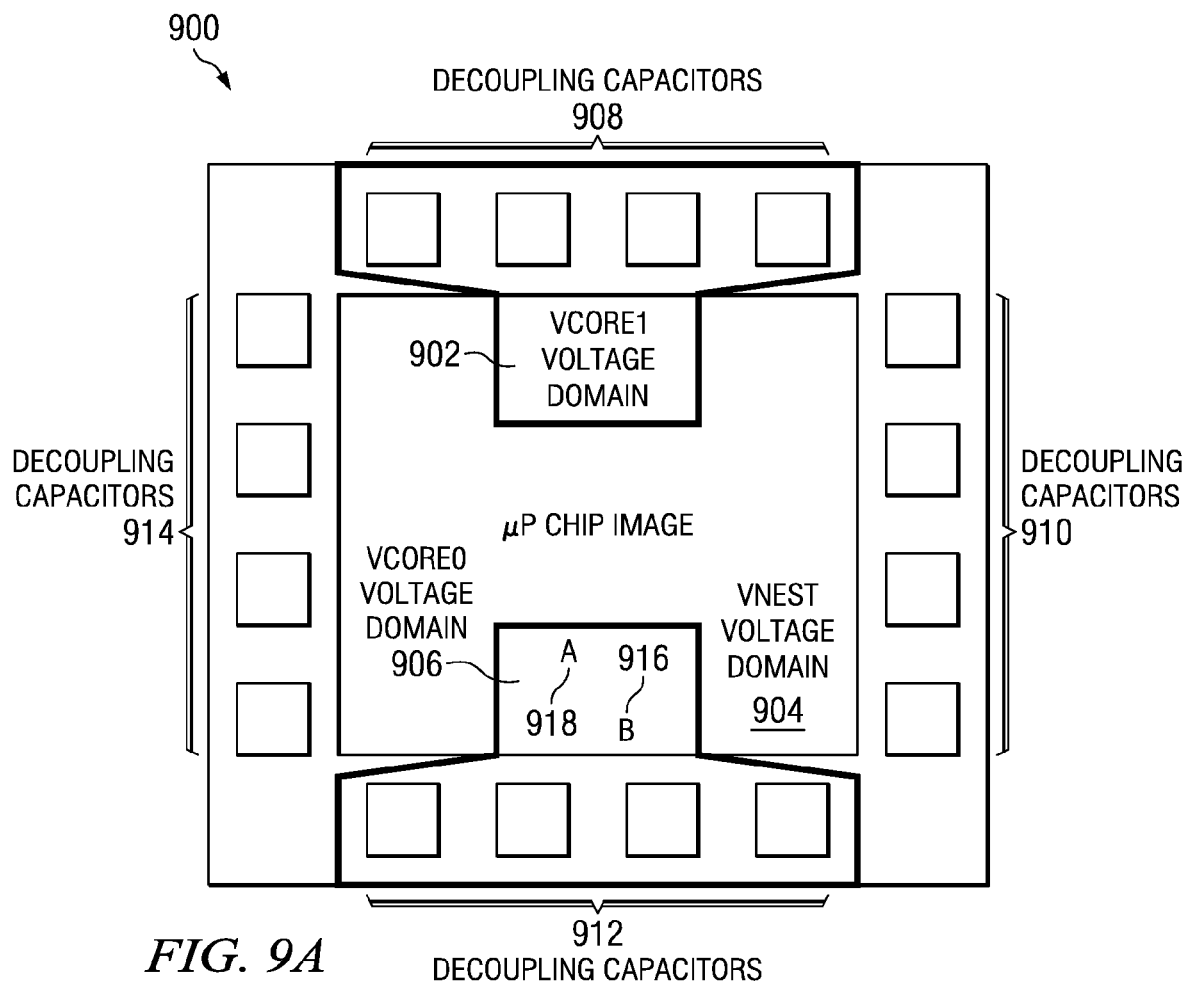
FIG. 9A is a diagram of an exemplary microprocessor chip comprising decoupling capacitors laid down on a module carrier in accordance with the illustrative embodiments.

FIG. 9A is a pin down view of a microprocessor chip comprising decoupling capacitors laid down on a module carrier in accordance with the illustrative embodiments. In this example, the circuits in chip 900 are partitioned spatially into different voltage domains, such as Vcore1 voltage domain 902, Vnest voltage domain 904, and Vcore0 voltage domain 906. Chip 900 also includes decoupling capacitors 908, 910, 912, and 914. As shown, circuits at location B 916 in chip 900 are located closer to decoupling capacitors 912 in Vcore0 voltage domain 906 than circuits at location A 918. While all of the circuits are affected by a draw of current, since the circuits at location B 916 are closer to decoupling capacitors 912 than the circuits at location A 918, decoupling capacitors 912 will mitigate the noise more for circuits at location B 916 than the circuits at location A 918. Consequently, circuits at location B 916 will experience a smaller voltage droop due to the current draw than the circuits at location A 918. However, the lowest droop, no matter if the lowest droop is at location A 918 or B 916, will determine the performance of the chip. Thus, it is desirable to have the voltage droop for location A 918 or B 916 be equivalent.

Figure 9B:
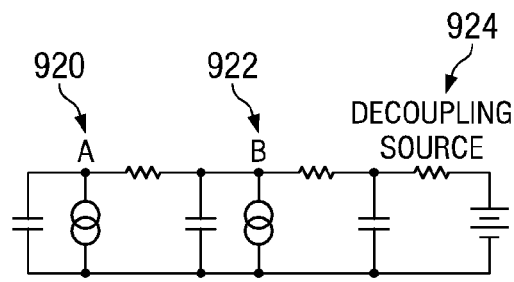
FIG. 9B is an exemplary electrical path from circuits at different locations to a decoupling capacitor in accordance with the illustrative embodiments.

FIG. 9B illustrates an exemplary electrical path from the circuits at different locations A 918 and B 916 in FIG. 9A to a decoupling capacitor in accordance with the illustrative embodiments. The electrical path from the circuits at location A 920 and location B 922 to decoupling source 924 is shown in FIG. 9B as current source loads. Like in FIG. 9A, the circuits at location B 922 are shown to be closer to decoupling source 924 in the chip than the circuits at location A 920. Thus, it is intuitive from the locations of the circuits in proximity to the decoupling capacitors that the voltage droop the circuits at location A 920 experience is highly influenced by the activity of the circuits at location B 922, as well as by the activity of location A's own circuits. In contrast, the circuits at location B 922 are less influenced by the activity of the circuits at location A 920.

Figure 10A:
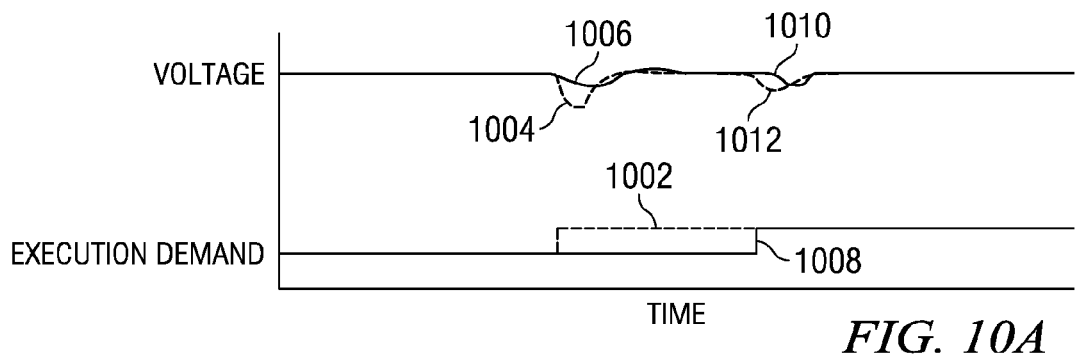
FIG. 10A is a chart illustrating voltage droop at different locations when step current changes are not concurrent in accordance with the illustrative embodiments.

FIG. 10A is a chart illustrating voltage droop at the different locations A 918 and B 916 in FIG. 9A when step current changes are not concurrent in accordance with the illustrative embodiments. Specifically, FIG. 10A illustrates the voltage droops which are expected (without execution throttling) at locations A and B given certain step current changes in execution demand. The left axis represents the execution demand of the circuit and the voltage. The horizontal axis represents the period of time that has passed.

When step current changes increase the execution demand for circuits at location A as shown by plot 1002, the voltage droop 1004 experienced at location A without execution throttling is shown to be much larger than the voltage droop 1006 experienced at location B. When step current changes also increase the execution demand 1008 for circuits at location B, the voltage droop 1010 experienced at location A without execution throttling is shown to be much less than the previous voltage droop 1004. In contrast, the voltage droop 1012 experienced at location B is shown to be similar to the previous voltage droop 1006 at location B. Consequently, FIG. 10A illustrates that while the voltage droop 1004 and 1010 at location A are highly influenced by the activity at location B, the voltage droop 1006 and 1012 at location B are less influenced by the activity of the circuits at location A.

Figure 10B:
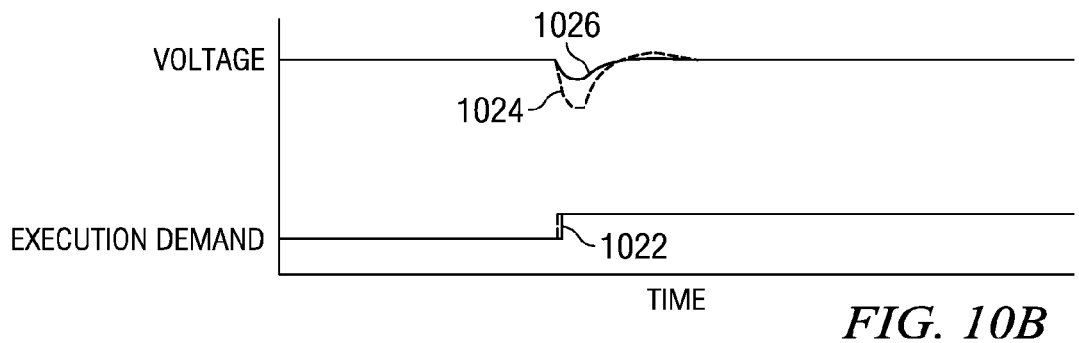
FIG. 10B is a chart illustrating voltage droop at different locations when step current changes are concurrent in accordance with the illustrative embodiments.

FIG. 10B is a chart illustrating voltage droop at different locations when step current changes are concurrent in accordance with the illustrative embodiments. In contrast with FIG. 10A, the step current changes (without execution throttling) in FIG. 10B are concurrent. Thus, when step current changes increase the execution demand as shown by plot 1022 for circuits at locations A and B, the voltage droop 1024 experienced at location A without execution throttling is shown to be much larger than the voltage droop 1026 experienced at location B, as well as larger than the voltage droop 1004 or 1010 for location A in FIG. 10A. In addition, the voltage droop 1026 for location B is also larger than voltage drop 1006 or 1012 for location B in FIG. 10A. Thus, FIG. 10B illustrates that the voltage droop experienced by both locations A and B is larger when the step current changes are concurrent in comparison with when the step current changes are not concurrent as in FIG. 10A. In addition, FIG. 10B also illustrates that a location (location A) which is farther from the decoupling capacitors has a larger droop than a location which is closer to the decoupling capacitors. Therefore, when execution throttling is employed locally at each location A and B, more throttling will occur at location A than at location B.

Figure 10C:
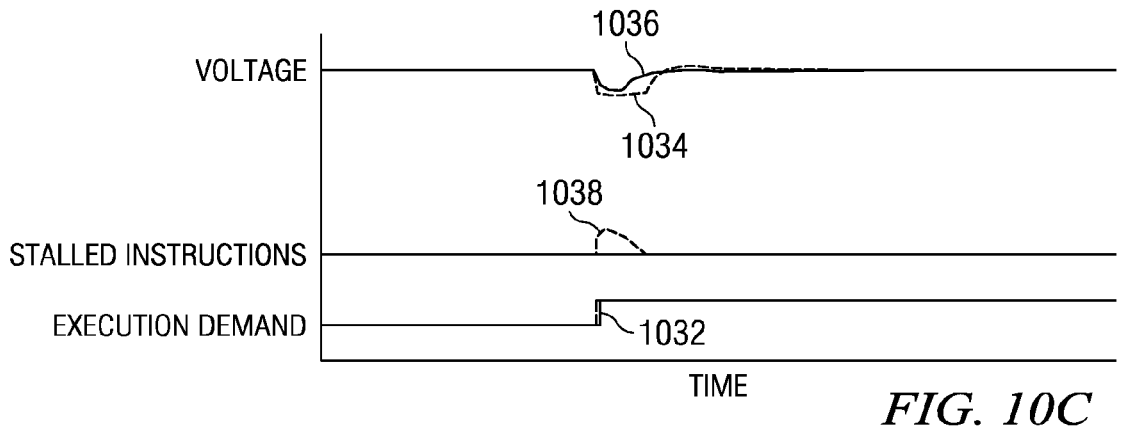
FIG. 10C is a chart illustrating voltage droop at different locations when step current changes are concurrent and execution throttling is locally employed in accordance with the illustrative embodiments.

FIG. 10C is a chart illustrating voltage droop at different locations when step current changes are concurrent and execution throttling is locally employed in accordance with the illustrative embodiments. 'Locally employed' means that execution of the instructions and throttling of the instructions are performed at the same location. When concurrent step current changes increase the execution demand as shown by plot 1032 for circuits at locations A and B, a voltage droop 1034 at location A and a voltage droop 1036 at location B occurs. In this example, a common droop threshold for locations A and B is used which results in a situation where instruction execution throttling is only performed at location A, but not at location B. When instructions at location A are throttled as shown by plot 1038, voltage droop 1034 at location A is reduced as shown. However, since all execution throttling is performed at location A (and not at location B), it may take longer for the backlog of stalled instructions at location A to clear, and it may be necessary to set a higher peak number of instructions pending in the backlog than if instructions were throttled at location B also.

Figure 10D:
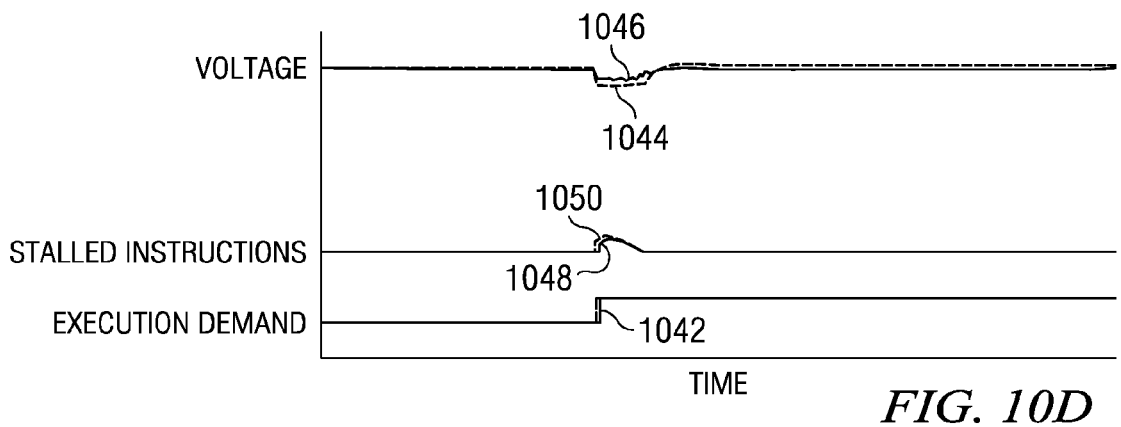
FIG. 10D is a chart illustrating voltage droop at different locations when step current changes are concurrent and where voltage droop sensing in one location initiates execution throttling in another location in accordance with the illustrative embodiments.

FIG. 10D is a chart illustrating voltage droop at different locations when step current changes are concurrent and where voltage droop sensing in one location initiates execution throttling in another location in accordance with the illustrative embodiments. In particular, FIG. 10D illustrates that a location (e.g., location B) which is electrically closer to a decoupling source will experience voltage droop from other locations farther down the decoupling distribution path (location A) and the location will have its local droop detection circuitry influenced by the droop detection circuitry of those other locations. As previously mentioned, this influence between locations further limits the droop of those execution units farthest away from the decoupling source by ensuring that the closer execution units limit further noise induced on the decoupling distribution path to those execution units at the end of the decoupling distribution path if those execution units in the locations farthest away are already throttling their instruction execution. Consequently, the influence between location A 918 and location B 916 may cause the voltage droops of both locations to be equivalent.

For example, when concurrent step current changes increase the execution demand as shown by plot 1042 for circuits at locations A and B, a voltage droop 1044 at location A and a voltage droop 1046 at location B occurs. In contrast with FIG. 10C, the voltage droop sensing circuitry at location A in this example initiates execution throttling in other areas such as location B as shown by plot 1048 (which also influences the voltage droop in location A) in addition to forcing execution throttling at its own location A as shown by plot 1050. In this scenario, the peak voltage droop, the time to clear the backlog of instructions at each location, and the peak number of instructions pending may be reduced in comparison with the cases of not employing execution throttling, or limiting the scope of the local droop sense circuits to control of execution throttling locally.

FIG. 11 is a flowchart of a process for configuring voltage droop thresholds for execution units across a semiconductor chip independently to allow execution units electrically closer to a decoupling source to be influenced by other units farther down the path in accordance with the illustrative embodiments. The process begins when concurrent step current changes increase the execution demand beyond a droop threshold for a circuit (step 1102), wherein the circuit is in a first location which is electrically farther from a decoupling source than a second location. The voltage droop sensing circuitry at the first location initiates execution throttling locally (step 1104), thereby affecting the voltage droop at that location. The voltage droop sensing circuitry at the first location also initiates execution throttling at the second location (step 1106), which influences the voltage droop at the first location. As the voltage droop at the first location is controlled by throttling at both the first and second locations, the process may adjust or reduce the peak droop, the time to clear the instruction backlog, or the peak number of executions pending (step 1108). Thus, by allowing the voltage droop sensing circuitry at a location which is farther down the power distribution path to initiate execution throttling at a second, closer location, the closer location limits further noise induced on the distribution path to the location farther from the decoupling source.

In addition to the spatial attributes which make it advantageous to have one voltage droop sensing circuit influence instruction initiations in areas physically remote from it as discussed above, the illustrative embodiments employ logic to ensure that executions of higher priority may be continued while at the same time controlling the stall of other pending executions of lesser priority. Alternatively, the number of requested stalls over a given period of time or the backlog in instruction execution demand may be monitored and used to throttle lower priority over higher priority instructions to maximize overall system performance. For instance, if instructions associated with a non-speculative code stream begin to droop to levels requiring the throttling of executions concurrent with instructions involving a speculative code stream, then depending upon the relative locality of the two execution units, executions to the lower priority unit may be throttled at a tighter droop threshold than the higher priority unit during the period that the execution backlog is considered too high on the unit executing higher priority instructions. In addition, overall performance may be optimized by prioritizing instructions that have already been delayed due to a cache miss or a context switch.

Figure 12:
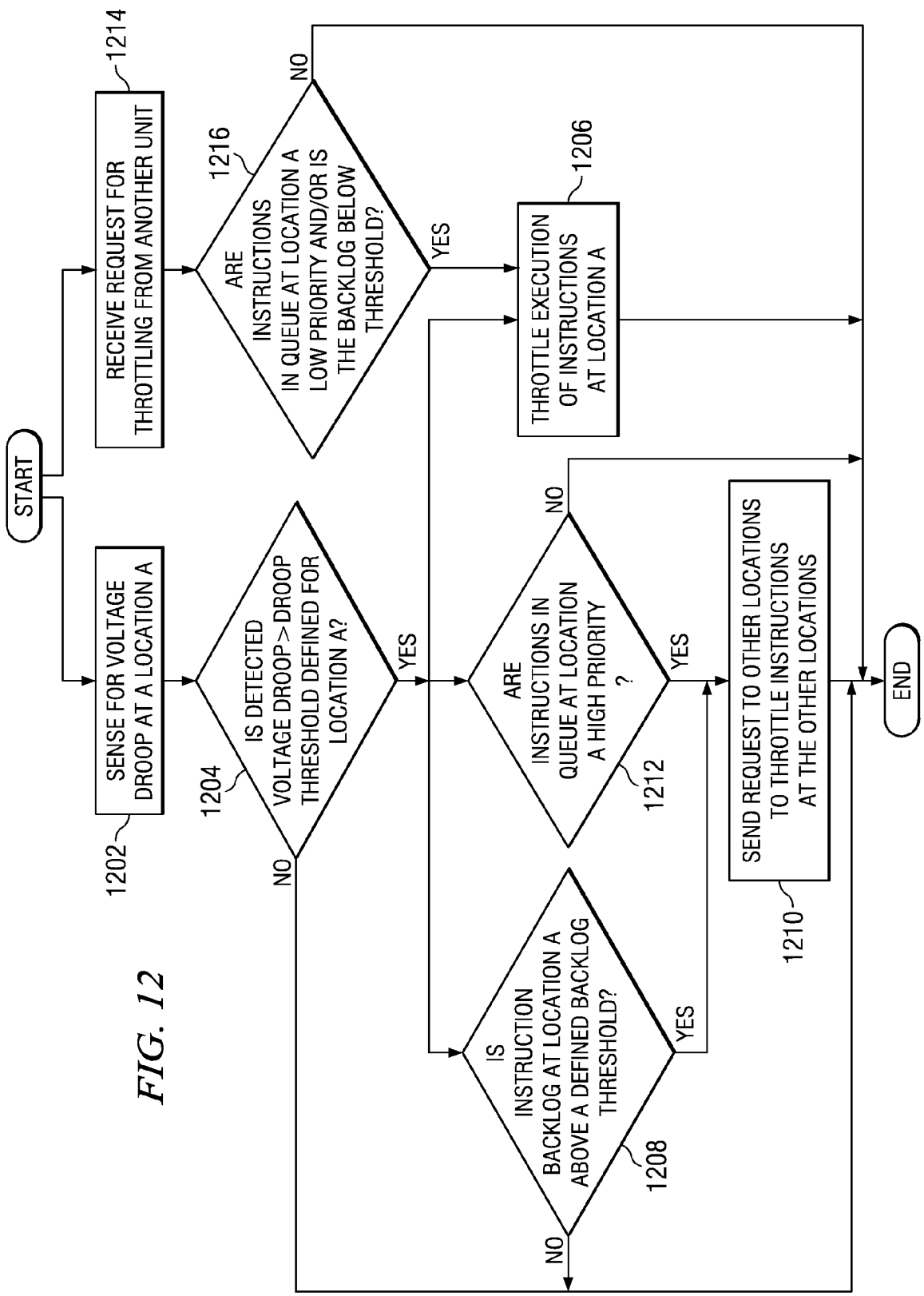
FIG. 12 is a flowchart of a process to minimize stalling of the execution of high priority instructions in accordance with the illustrative embodiments.

FIG. 12 is a flowchart of a process to minimize stalling of the execution of high priority instructions in accordance with the illustrative embodiments. The flowchart is provided which maximizes overall system performance by ensuring that stalling the execution of high priority instructions is minimized. Thus, execution of higher priority instructions is allowed to continue while other pending executions of lesser priority instructions may be stalled accordingly. The number of requested stalls over a given period of time or the backlog in instruction execution demand may also be monitored and used to throttle lower priority over higher priority instructions.

The process begins at voltage monitor/throttle request determiner unit 106 in FIG. 1 which senses for voltage droop at a location A (step 1202). The voltage monitor/throttle request determiner unit then determines if the detected voltage droop is greater than a droop threshold defined for location A (step 1204). If the detected voltage droop is not greater than a droop threshold defined for location A ('no' output of step 1204), the process path terminates thereafter.

Turning back to step 1204, if the detected voltage droop is greater than a droop threshold defined for location A ('yes' outputs of step 1204), the process continues down parallel paths. In the first path, the voltage monitor/throttle request determiner unit throttles execution of instructions at location A (step 1206). In the second path, the voltage monitor/throttle request determiner unit determines if the backlog of instructions for the execution unit at location A is above a defined backlog threshold (step 1208). A backlog comprises the number of instructions which are pending at an execution unit. If the backlog of instructions for the execution unit at location A is above a defined backlog threshold ('yes' output of step 1208), the voltage monitor/throttle request determiner unit at location A sends a request to other locations to throttle instructions at those other locations (step 1210). For example, the voltage monitor/throttle request determiner unit at location A sends a request to the voltage monitor/throttle request determiner unit at location B to throttle the instructions at location B. If the backlog of instructions for the execution unit at location A is not above a defined backlog threshold ('no' output of step 1208), the process path terminates thereafter.

In the third path, the voltage monitor/throttle request determiner unit determines if the instructions in the backlog queue at location A are at a high priority (step 1212). If the instructions in the backlog queue at location A are at a high priority ('yes' output of step 1008), the voltage monitor/throttle request determiner unit at location A sends a request to other locations to throttle instructions at the other locations (step 1210).

Location A sends a request to location B to throttle at location B in order for location A to be able to execute more instructions and execute instructions more quickly. The two parallel paths from the threshold determination in step 1204 to step 1210 which requests throttling at other units illustrate that what makes an instruction stream 'high priority' may be situational. For instance, the backlog threshold determination in step 1208 implies that once the instruction execution backlog reaches some threshold, the increase in the backlog should be curbed or the backlog should be reduced at the expense of instruction stream execution at other execution units. It is also implied by the flow diagram that once the droop threshold is crossed, local execution throttling will commence even with the help of execution throttling by remote units.

While voltage monitor/throttle request determiner unit senses the voltage droop at location A in step 1202, voltage monitor/throttle request determiner unit may receive, in a parallel path, a request for throttling from another location (step 1214). This parallel path illustrates a request to stall execution from another voltage droop sensing circuit, such as from location B. However, this request is serviced only if the local execution unit (at location A) is not involved with any high priority instructions, which could also include having an excessive execution backlog at that location. The voltage monitor/throttle request determiner unit determines if the instructions in the queue at location A are low priority and/or if the backlog is below the backlog threshold (step 1216). If the instructions in the queue at location A are low priority and/or if the backlog is below the backlog threshold ('yes' output of step 1216), voltage monitor/throttle request determiner unit throttles execution of instructions at location A (step 1206). By allowing priority of execution in some units to depend upon the priority of the instruction stream, with lower priority instructions stalled at perhaps less influential (with respect to voltage droop sensitivity to instruction execution at the location where the high priority instructions are being executed) units, the overall perceived performance of the chip may be improved.

The illustrative embodiments also allow for modifying the voltage droop sensing circuitry to accept multiple levels to offset the effects of previous execution demand on the voltage presented by the power distribution system and its load line, whether explicitly or parasitically implemented. For example, if prior to the execution demand step instructions had been executing at 50% of the capacity of a micro-processor before stepping to a 90% demand, the voltage at the circuits would be lower (assuming the common resistive load line associated with the power distribution system and voltage regulator supply) than if there are little to no instruction executions prior to the step in demand. Since the error-free operating instantaneous voltage for the circuits involved in executing the instructions will be limited to a minimum voltage, the error-free droop allowed for the step in demand starting from a very low demand is greater than if there are significant instruction executions prior to the step in demand. Making the detection circuits more forgiving (providing a loose droop threshold) as a consequence of less activity prior to the step in demand results in less throttling and higher performance.

FIG. 13 is a chart illustrating the advantage of monitoring the state of instruction execution throughput prior to a step current change in execution demand for the purpose of selecting a different droop threshold prior to stalling executions. The voltage droop sensing circuitry may be modified to accept multiple droop threshold levels to offset the effects of previous execution demand on the voltage presented by the power distribution system and its load line. The left axis represents the voltage. The horizontal axis represents the period of time that has passed.

Three cases are illustrated in FIG. 13. Case A 1302 is the expected response when the steady state instruction execution demand is stepped from 50% capacity to 90% with a given droop threshold. Case Bi 1304 is the expected response when the steady state instruction execution demand is stepped from 0% capacity to 90% with the same droop threshold as case A 1302. The voltage in case A 1302 is lower than case Bi 1304 where there are no instruction executions prior to the step in demand. Since case Bi 1304 has a larger increase in activity (0% to 90%) than case A (50% to 90%) 1302, case Bi 1304 will experience a larger voltage droop than case A 1302. Consequently, case Bi 1304 will have instructions stalls which last longer than the stalls for case A 1302. If the droop threshold is a constant percentage of Vdd independent of steady state instruction execution demand, due to the load line of the power distribution network and regulator, the voltage droop is contained to maintain the instantaneous voltage to the circuits at a higher level if the step current change was from case Bi 1304 rather than case A 1302.

Case Bii 1306 is the expected response when the steady state instruction execution demand is stepped from 0% capacity to 90% with a droop threshold which is greater for case Bii 1306 than case A 1302. By selecting a different droop threshold based on the instructions being executed and prior to stalling executions, the magnitude of the peak backlog and the time to flush the backlog may be shortened if a larger droop threshold is used as illustrated in case Bii 1306, without sacrificing the worst case minimum instantaneous voltage the circuits would experience. Thus, the rate of instruction initiations is monitored in order to modify the droop sensing threshold correspondingly.

FIG. 14 is an exemplary circuit diagram of a voltage droop sensor comprising multiple voltage droop thresholds in accordance with the illustrative embodiments. Allowing multiple droop thresholds which makes the detection circuits more forgiving (i.e., greater droop threshold) as a consequence of less activity prior to the step demand change results in less throttling and higher performance. A simple two threshold example is shown in FIG. 14 to illustrate allowing multiple droop thresholds. Multiple droop thresholds comprise tight threshold 1402 and loose threshold 1404. These thresholds are set by resistor chains 1406. Tight threshold 1402 is selected by control input 1408 to multiplexer 1410 if the execution unit which is the target of this droop sense circuitry has been heavily loaded. Loose threshold 1404 is also selected by control input 1408 to multiplexer 1410 if the execution unit has previously been lightly loaded.

FIG. 15 is a flowchart of a process for modifying the voltage droop threshold based on previous execution demand in accordance with the illustrative embodiments. The process begins with monitoring instruction execution throughput at an execution unit (step 1502). Based on the detected throughput, the process adjusts the voltage droop threshold (e.g., to a loose droop threshold) to accommodate the voltage requirements of the previous execution demand (step 1504). Allowing for multiple droop thresholds at a location and adjusting the drop thresholds in this manner causes the sensing circuitry to be more forgiving (and thereby decreasing throttling required) as a consequence of less processor activity prior to the step in demand.

The illustrative embodiments also allow for configuring multiple voltage droop sense circuits with distinctive droop thresholds and averaging times so they are used to throttle one or more execution units. A sensor with a small droop threshold and a short averaging window is logically OR'd with a sensor with a larger droop threshold and a longer averaging window to control execution throttling in order to limit first droop overshoots due to high frequency response, but still ensuring that the maximum lower frequency response of the power distribution network does not droop beyond a selectable criteria. It is possible in the extreme to change the averaged voltage threshold window for one of these OR'd sensors to a DC amount and use a hard reference to ensure that a minimum instantaneous voltage due to droop will not be exceeded without stalling subsequent initiation of executions. However, there will be voltage overshoot, so such a hard threshold does not necessarily protect against lower voltages being presented to the circuits.

Turning now to FIG. 16, an exemplary circuit diagram of a voltage droop sensor comprising multiple voltage droop thresholds and multiple averaging windows in accordance with the illustrative embodiments is shown. In particular, FIG. 16 provides a further alteration to the voltage droop sensing circuitry in FIG. 14 and illustrates that the averaging time windows of the voltage may be customized to each of the droop thresholds.

There are two conditions identified at droop sensing circuit 1600, either of which will request execution throttling to limit the voltage droop. One of these conditions is met when there is a small change in voltage droop in a relatively short power supply averaging time window. When a step change in demand for instructions to be executed occurs, if the step change in current is large, a significant overshoot of the droop beyond the droop threshold occurs. The overshoot is the amount the voltage traverses below the threshold. The overshoot depends on how fast the power supply decoupling and power distribution network can respond to the current changes that result from executing or throttling instructions. A large overshoot may typically occur immediately after a step load current change (in this case, as a result of step increase in demand for executions instantaneously). This droop will ring at the initiation of the step, then settle out (e.g., see plot 1702 in FIG. 17 to observe that the first droop is large compared to the rest of the throttled waveform.) The small droop threshold accounts for the expected further overshoot of the droop voltage. However, since the averaging time window is small, the actual droop experienced influences the average time window which the droop threshold is referenced to, such that the instantaneous voltage will decline until the instruction backlog is consumed unless another parallel mechanism is introduced to prevent this decline from occurring. This other mechanism is a parallel droop sensor with a larger droop threshold and a larger averaging time window.

Thus, the voltage droop sensing circuitry is altered in FIG. 16 by having a sensor with a small droop threshold and a short averaging window logically OR'd with a sensor with a larger droop threshold and a longer averaging window to control execution throttling. As shown, droop sensing circuit 1600 comprises resistors 1602-1614, capacitors 1616 and 1618, comparators 1620 and 1622, OR gate 1624, and latch 1626. In this example, droop sensing circuit 1600 comprises two sensors, each sensor containing a time constant and a voltage droop threshold. Capacitor 1616 comprises a small time constant and capacitor 1618 comprises a larger time constant. Comparator 1620 provides a tight (small) droop threshold and a short time window for the first sensor, and comparator 1640 provides a loose (large) droop threshold and a long time window for the second sensor. The control of execution throttling limits first-droop overshoots caused by high frequency response, and also ensures that the maximum lower frequency response of the power distribution network does not droop beyond a selectable criteria.

FIG. 17 is a chart illustrating an impact of multiple voltage droop thresholds and multiple averaging windows in the circuit in FIG. 16 in accordance with the illustrative embodiments. The droop sensing circuit with multiple thresholds and averaging windows results in an optimum tradeoff between the effects of the instruction demand step's initial power distribution response, and the lower frequency response. For example, a tight droop threshold with a long averaging time window as shown by plot 1702 may have a tight steady state droop, but unfortunately has a much longer time window. In comparison, a tight droop threshold with a much smaller averaging time window as shown by plot 1704 results in a similar droop with a shorter time window. However, the smaller averaging time window may cause the droop to be larger at the point where the instruction backlog is cleared, in comparison with the droop resulting from the long averaging time window. Thus, subsequent peaks will droop lower than the first droop.

The droop resulting from using the dual threshold/averaging window as shown by plot 1706 illustrates that a tight threshold with a small averaging window OR'd with a looser threshold with a larger averaging window using the circuitry in FIG. 16 may limit the worst case droop scenario, but it also minimizes the peak number of instructions in the backlog, as well as the time needed to clear the backlog.

FIG. 18 is a flowchart of a process for configuring multiple voltage droop sensing circuits with distinctive voltage droop thresholds and averaging time windows for throttling execution units in accordance with the illustrative embodiments. The process sets the averaging window for the faster voltage sensing circuit to provide instruction throttling based on the first droop response to the step excitation. The frequency characteristics of the first droop response time characteristic is given by the power supply distribution impedance as seen by the chip circuits. The threshold for the faster voltage sensing circuit is set so that this first droop marginally meets the circuit requirements for voltage droops. The second looser threshold and its averaging window is then set iteratively or otherwise so that the combination of the second looser threshold and the averaging window associated with it results in a minimum time in which execution throttling and the resulting number of instruction stalls in queue are minimized. During this process, a sensitivity instruction stalls and the time to clear the queue to the second threshold and its averaging window may be determined to expedite the iterative convergence to an optimum design.

The process begins with setting a requirement for a minimum voltage droop allowed for the circuits (step 1802). The maximum tight threshold which is required to ensure that a maximum step increase in execution demand results in a first droop that marginally meets the minimum voltage droop allowed is determined (step 1804). A averaging window for the tight thresholds is set to primarily filter the ring frequency of the first droop (step 1806).

A second threshold which is at or looser than the first threshold for the first droop is determined (step 1808). A second larger averaging time window associated with the second looser threshold which ensures that the largest droop associated with the remaining step change in processor execution demand cycles marginally meets the minimum voltage droop allowed requirement is determined (step 1810).

The sensitivity of time to flush the backlog of execution stalls as a function of threshold is computed and extrapolated (step 1812). A determination is then made as to whether this combination of thresholds and averaging windows minimize that backlog (step 1814). If the combination of thresholds and averaging windows minimize the backlog ('yes' output of step 1814), the process terminates thereafter. This result provides a solution that minimizes execution stalls and time to flush the backlog resulting from throttling execution demand.

Turning back to step 1814, if the combination of thresholds and averaging windows do not minimize the backlog ('no' output of step 1814), a new second looser threshold is determined given the sensitivity information determined in step 1812 with the intent to minimize the backlog (step 1816). The process then returns to step 1810 as the 'no' feedback path.

Thus, the illustrative embodiments provide various mechanisms to fine tune the amount of performance that may be gleaned from an integrated circuit such as a microprocessor. By refining the application of execution throttling as proposed, the already minute performance impacts associated with the implementation in the referenced U.S. patent application Ser. Nos. 11/420,825 and 11/420,820 may be further minimized.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing voltage droop thresholds for execution units across a semiconductor chip, the computer implemented method comprising:

detecting environmental parameters for various locations on a chip;

determining timing margins for the locations;

determining an acceptable voltage droop for a location based on the environmental parameters and the timing margin for the location;

determining a droop threshold for the location based on the corresponding acceptable voltage droop determined for the location;

detecting an increase in instruction execution demand beyond the droop threshold for a first location, wherein the first location is located electrically farther from a decoupling source than a second location; and initiating execution throttling locally at the first location and initiating execution throttling at the second location to control voltage droop at the first location.

2. The computer implemented method of claim 1, further comprising:

comparing the droop threshold to an actual voltage droop detected for the location; and responsive to a determination that the actual voltage droop detected for the location equals or exceeds the droop threshold for that location, throttling execution of instructions at an execution unit in that location on the chip.

3. The computer implemented method of claim 2, further comprising:

determining that a backlog of instructions for the execution unit at the first location is above a defined backlog threshold; and sending a request from the first location to other locations on the chip to throttle instructions at those other locations.

4. The computer implemented method of claim 2, further comprising:

determining that the instructions in a backlog of instructions for the execution unit at the first location are at a high priority; and sending a request from the first location to other locations on the chip to throttle instructions at those other locations.

5. The computer implemented method of claim 4, further comprising:

receiving the request at a second location; and responsive to a determination that the execution unit at the second location is not servicing high priority instructions or the backlog at the execution unit at the second location is not above the backlog threshold, throttling execution of instructions at the second location.

6. The computer implemented method of claim 1, wherein the environmental parameters include at least one of temperature, voltage gradient, or across chip line variations.

7. The computer implemented method of claim 1, wherein initiating execution throttling at the first location limits noise induced on a distribution path to the first location.

8. The computer implemented method of claim 1, wherein initiating execution throttling at the second location to control voltage droop at the first location further limits noise induced on a distribution path to the first location.

9. The computer implemented method of claim 1, further comprising:

monitoring instruction execution throughput at an execution unit at a location on the chip; and adjusting the droop threshold based on the instruction execution throughput to accommodate voltage requirements of a previous instruction execution demand.

10. The computer implemented method of claim 9, wherein the droop threshold is adjusted to a looser droop threshold as a consequence of the previous instruction execution demand requiring less processor activity prior to a step in instruction execution demand.

11. The computer implemented method of claim 1, further comprising:

setting a requirement for a minimum voltage droop allowed for a location;

determining a maximum droop threshold required which ensures that a maximum step increase in instruction execution demand results in a first voltage droop that marginally meets a minimum voltage droop allowed;

determining a first averaging window associated with the maximum droop threshold;

determining a second threshold at or looser than the maximum droop threshold for a first voltage droop;

determining a second larger averaging time window associated with the second threshold which ensures that a largest voltage droop associated with a remaining step change in instruction execution demand cycles marginally meets the minimum voltage droop allowed;

computing a sensitivity of time to flush a backlog of instructions at an execution unit at the location as a function of the maximum droop and second thresholds; and determining that a combination of the maximum droop and second thresholds and the first and second averaging windows minimize the backlog of instructions resulting from throttling execution demand.

12. The computer implemented method of claim 11, further comprising:

responsive to a determination that the maximum droop and second thresholds and the first and second averaging windows do not minimize the backlog of instructions, adjusting the second threshold to allow the sensitivity of time to flush the backlog of instructions at an execution to identify an adjusted second threshold to minimize the backlog.

* * * * *